US011405219B2

(12) United States Patent
Zhuo

(10) Patent No.: US 11,405,219 B2
(45) Date of Patent: *Aug. 2, 2022

(54) SHARED BLOCKCHAIN DATA STORAGE

(71) Applicant: Advanced New Technologies Co., Ltd., Grand Cayman (KY)

(72) Inventor: Haizhen Zhuo, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 17/397,779

(22) Filed: Aug. 9, 2021

(65) Prior Publication Data
US 2021/0367790 A1 Nov. 25, 2021

Related U.S. Application Data

(63) Continuation of application No. 17/087,395, filed on Nov. 2, 2020, now Pat. No. 11,088,849, which is a continuation of application No. 16/928,794, filed on Jul. 14, 2020, now Pat. No. 10,892,898, which is a continuation of application No. 16/714,197, filed on
(Continued)

(51) Int. Cl.
  *H04L 9/32* (2006.01)
  *G06F 16/901* (2019.01)
  *H04L 9/06* (2006.01)

(52) U.S. Cl.
  CPC ........ *H04L 9/3247* (2013.01); *G06F 16/9027* (2019.01); *H04L 9/0637* (2013.01); *H04L 9/0643* (2013.01); *H04L 2209/38* (2013.01)

(58) Field of Classification Search
  CPC ... H04L 9/3247; H04L 9/0637; H04L 9/0643; H04L 2209/38; G06F 16/9027
  See application file for complete search history.

(56) References Cited

U.S. PATENT DOCUMENTS 10,102,265 B1   10/2018   Madisetti et al.
10,291,627 B2   5/2019    Gleichauf
(Continued)

FOREIGN PATENT DOCUMENTS

CN   106874087   6/2017
CN   107070938   8/2017
(Continued)

OTHER PUBLICATIONS

Marianna Belotti et al, A Vademecum on Blockchain Technologies: When, Which, and How, IEEE (Year: 2019).*
(Continued)

*Primary Examiner* — Shanto Abedin
(74) *Attorney, Agent, or Firm* — Fish & Richardson P.C.

(57) ABSTRACT

Disclosed herein are methods, systems, and apparatus, including computer programs encoded on computer storage media, for communicating and sharing blockchain data. One of the methods includes sending current state information associated with a current block of a blockchain to one or more shared storage nodes of the blockchain network; sending a hash value to the one of the one or more shared storage nodes for retrieving an account state stored in the historic state tree; receiving the account state in response to sending the hash value; and verifying, by the consensus node, that the account state is part of the blockchain based on the hash value.

20 Claims, 9 Drawing Sheets

Related U.S. Application Data

Dec. 13, 2019, now Pat. No. 10,826,709, which is a continuation of application No. PCT/CN2019/095625, filed on Jul. 11, 2019.

(56) References Cited

U.S. PATENT DOCUMENTS

| | | | |
|---|---|---|---|
| 11,196,542 B2* | 12/2021 | Natarajan | G06F 16/2255 |
| 11,227,057 B2* | 1/2022 | Irazabal | H04L 63/0428 |
| 2012/0036317 A1 | 2/2012 | Torii | |
| 2016/0164884 A1 | 6/2016 | Sriram et al. | |
| 2017/0255950 A1 | 9/2017 | Krug | |
| 2018/0183600 A1 | 6/2018 | Davis | |
| 2018/0189312 A1 | 7/2018 | Alas et al. | |
| 2018/0191502 A1 | 7/2018 | Karame | |
| 2018/0349621 A1* | 12/2018 | Schvey | G06Q 20/223 |
| 2019/0018887 A1 | 1/2019 | Madisetti et al. | |
| 2019/0018888 A1 | 1/2019 | Madisetti et al. | |
| 2019/0034465 A1 | 1/2019 | Shimamura | |
| 2019/0065788 A1 | 2/2019 | Vijayasankar et al. | |
| 2019/0073645 A1 | 3/2019 | Dazin | |
| 2019/0097790 A1 | 3/2019 | Li et al. | |
| 2019/0102163 A1 | 4/2019 | Witherspoon | |
| 2019/0139043 A1 | 5/2019 | Davis | |
| 2019/0156332 A1* | 5/2019 | Christidis | H04L 9/14 |
| 2019/0188699 A1 | 6/2019 | Thibodeau et al. | |
| 2019/0188700 A1 | 6/2019 | August et al. | |
| 2019/0188701 A1 | 6/2019 | Parsons et al. | |
| 2019/0251124 A1 | 8/2019 | Pan et al. | |
| 2019/0251199 A1 | 8/2019 | Klianev | |
| 2019/0268407 A1* | 8/2019 | Zeng | H04L 67/1091 |
| 2019/0279172 A1* | 9/2019 | Duffield | G06Q 20/02 |
| 2019/0310900 A1 | 10/2019 | Lee et al. | |
| 2019/0332955 A1 | 10/2019 | Manamohan et al. | |
| 2019/0334859 A1 | 10/2019 | Kannan et al. | |
| 2019/0370250 A1 | 12/2019 | Tipton et al. | |
| 2019/0373472 A1 | 12/2019 | Smith et al. | |
| 2019/0386969 A1 | 12/2019 | Verzun et al. | |
| 2019/0392118 A1 | 12/2019 | Elden et al. | |
| 2020/0004643 A1 | 1/2020 | Yang | |
| 2020/0007317 A1 | 1/2020 | Thompson | |
| 2020/0026700 A1 | 1/2020 | Qiu | |
| 2020/0034353 A1 | 1/2020 | Innocenti | |
| 2020/0044824 A1* | 2/2020 | Xie | H04L 9/0637 |
| 2020/0057760 A1 | 2/2020 | Zhao | |
| 2020/0073758 A1 | 3/2020 | Natarajan et al. | |
| 2020/0073962 A1 | 3/2020 | Natarajan et al. | |
| 2020/0076571 A1 | 3/2020 | Natarajan et al. | |
| 2020/0076603 A1 | 3/2020 | Li et al. | |
| 2020/0092086 A1 | 3/2020 | Raman et al. | |
| 2020/0143372 A1 | 5/2020 | Liu et al. | |

FOREIGN PATENT DOCUMENTS

| | | |
|---|---|---|
| CN | 107169765 | 9/2017 |
| CN | 107659429 | 2/2018 |
| CN | 107807984 | 3/2018 |
| CN | 109117097 | 1/2019 |
| CN | 109145163 | 1/2019 |
| CN | 109409889 | 3/2019 |
| CN | 109481936 | 3/2019 |
| CN | 109726229 | 5/2019 |
| CN | 109977274 | 7/2019 |
| WO | WO 2018137624 | 8/2018 |
| WO | WO 2019101230 | 5/2019 |
| WO | WO 2019101246 | 5/2019 |

OTHER PUBLICATIONS

Machine translation of Chinese patent document CN 109726229 A (Year: 2019).*
Machine translation of Chinese patent document No. CN 107807984 A (Year: 2018).*
Crosby et al., "BlockChain Technology: Beyond Bitcoin," Sutardja Center for Entrepreneurship & Technology Technical Report, Oct. 16, 2015, 35 pages.
Extended European Search Report in European Application No. 19770326.7, dated Aug. 5, 2020, 8 pages.
Extended European Search Report in European Application No. 19771011.4, dated Aug. 28, 2020, 6 pages.
Extended Search Report in European Application No. 19770467.9, dated Aug. 28, 2020, 8 pages.
Github.com [online]: "A Next-Generation Smart Contract and Decentralized Application Platform", Jun. 2019, retrieved on Feb. 4, 2020, retrieved from URL <https://github.com/ethereum/wiki/wiki/White-Paper>, 48 pages.
Nakamoto, "Bitcoin: A Peer-to-Peer Electronic Cash System," www.bitcoin.org, 2005, 9 pages.
PCT International Search Report and Written Opinion in International Application No. PCT/CN2019/095617, dated Apr. 13, 2020, 9 pages.
PCT International Search Report and Written Opinion in International Application No. PCT/CN2019/095625, dated Apr. 13, 2020, 8 pages.
PCT International Search Report and Written Opinion in International Application No. PCT/CN2019/095632, dated Apr. 13, 2020, 7 pages.
Zhang et al., "A Method to Predict the Performance and Storage of Execution Contract for Ethereum Consortium-Blockchain," International Conference on the Theory and Applications of Cryptographic Techniques, Eurocrypt 2018, Jun. 2018, pp. 63-74.
PCT International Preliminary Report on Patentability in International Application No. PCT/CN2019/095617, dated Jan. 11, 2022, 6 pages.
PCT International Preliminary Report on Patentability in International Application No. PCT/CN2019/095625, dated Jan. 11, 2022, 6 pages.
PCT International Preliminary Report on Patentability in International Application No. PCT/CN2019/095632, dated Jan. 11, 2022, 5 pages.

* cited by examiner

SHARED BLOCKCHAIN DATA STORAGE

CROSS-REFERENCE TO RELATED APPLICATIONS

This application is a continuation of and claims the benefit of priority of U.S. patent application Ser. No. 17/087,395, filed Nov. 2, 2020, which is a continuation of and claims the benefit of priority of U.S. patent application Ser. No. 16/928, 794, filed Jul. 14, 2020, which is a continuation of U.S. patent application Ser. No. 16/714,197, filed Dec. 13, 2019, now U.S. Pat. No. 10,826,709, which is a continuation of PCT Application No. PCT/CN2019/095625, filed on Jul. 11, 2019, which is hereby incorporated by reference in its entirety.

TECHNICAL FIELD

This specification relates to shared storage of blockchain data.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by distributed computing platform such as an Ethereum. For example, the Ethereum virtual machine (EVM) provides the runtime environment for smart contracts in Ethereum. An Ethereum blockchain can be viewed as a transaction-based state machine. State data in an Ethereum can be assembled to a global shared-state referred to as a world state. The world state comprises a mapping between Ethereum account addresses and account states. The world state can be stored in data structures such as the Merkle Patricia tree (MPT).

Besides state data, blockchain networks can also store other types of data such as block data and index data. Block data can include block header and block body. The block header can include identity information of a particular block and the block body can include transactions that are confirmed with the block. When more and more transactions are entered into the blockchain, state data and block data can grow very large in size. In some DLSs, every node stores an entire copy of the blockchain, which can take large amount of storage spaces, even if some of the old block data or state data are not frequently visited.

Accordingly, it would be desirable to reduce the amount of data stored on at least some of the nodes in the DLS to save storage cost without significantly affecting processing efficiency.

SUMMARY

This specification describes technologies for communicating and sharing blockchain data. These technologies generally involve sending, by a consensus node of a blockchain network, current state information associated with a current block of a blockchain to one or more shared storage nodes of the blockchain network, wherein the consensus node stores the current state information and the one or more shared storage nodes store historic state information associated with every block of the blockchain as a historic state tree, and wherein the historic state tree includes key-value pairs (KVPs) with values being account states of accounts associated with the blockchain network and keys being hash values of the corresponding account states; sending, by the consensus node, a hash value to the one of the one or more shared storage nodes for retrieving an account state stored in the historic state tree; receiving, by the consensus node, the account state in response to sending the hash value; and verifying, by the consensus node, that the account state is part of the blockchain based on the hash value.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

DETAILED DESCRIPTION

Figure 1:
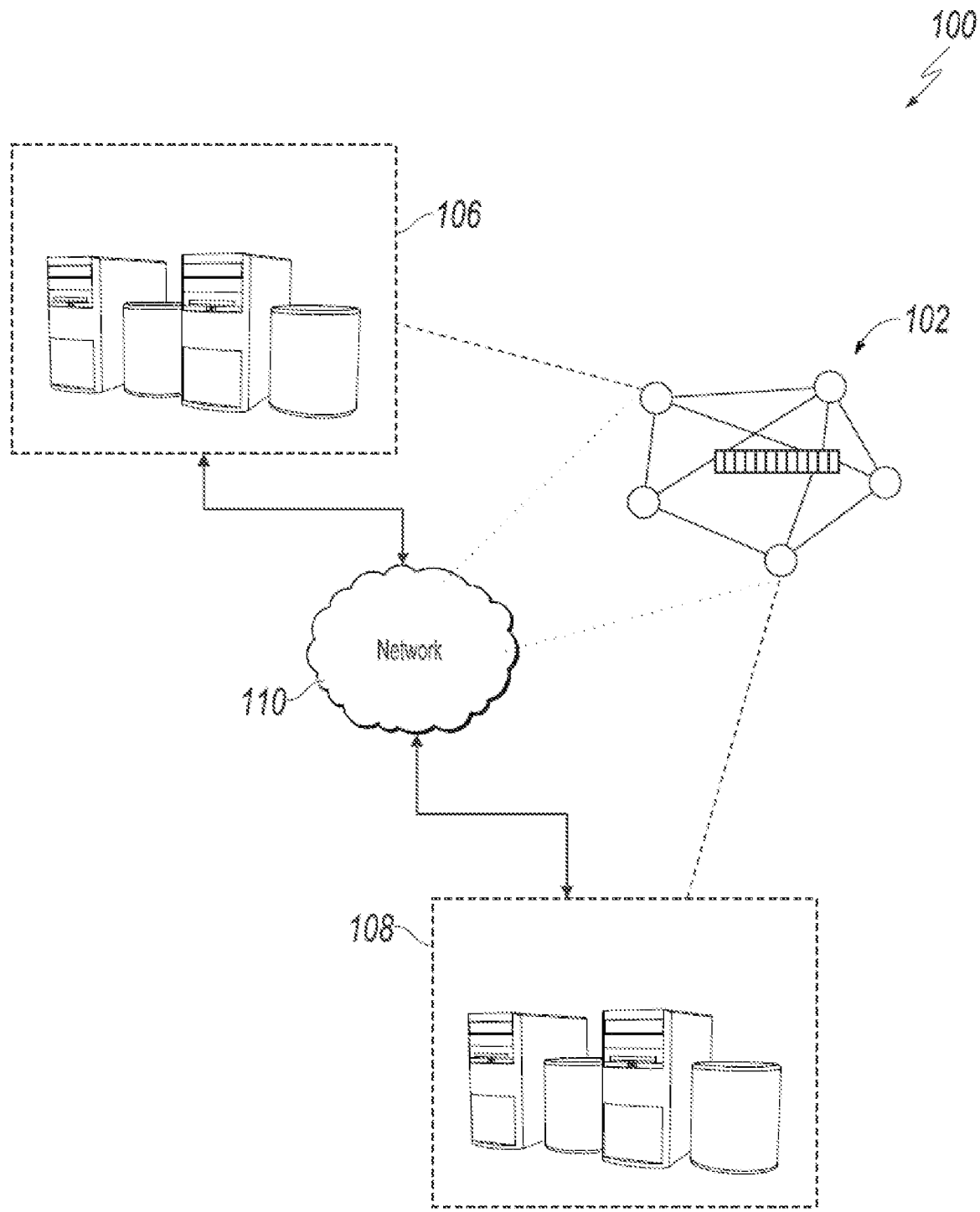
FIG. 1 depicts an example of an environment that can be used to execute embodiments of this specification.

This specification describes technologies for communicating and sharing blockchain data. These technologies generally involve sending, by a consensus node of a blockchain network, current state information associated with a current block of a blockchain to one or more shared storage nodes of the blockchain network, wherein the consensus node stores the current state information and the one or more shared storage nodes store historic state information associated with every block of the blockchain as a historic state tree, and wherein the historic state tree includes key-value pairs (KVPs) with values being account states of accounts associated with the blockchain network and keys being hash values of the corresponding account states; sending, by the consensus node, a hash value to the one of the one or more shared storage nodes for retrieving an account state stored in the historic state tree; receiving, by the consensus node, the account state in response to sending the hash value; and verifying, by the consensus node, that the account state is part of the blockchain based on the hash value.

The techniques described in this specification produce several technical effects. For example, embodiments of the subject matter can allow savings of storage resources of blockchain nodes without significantly sacrificing computational efficiency. Because most data in the historic state tree are "cold" data that are infrequently used, by saving the "cold" data only in the shared storage nodes, usage rate of storage space across the blockchain network can be significantly improved. If the share storage node is a POA node or elected by voting based on PBFT consensus, the historic state tree only needs to be stored in the share storage node instead of storing on every blockchain node. If shared storage nodes are part of the blockchain consensus nodes without POA, for an N consensus nodes blockchain network, where N equals 3f+1, 3f+2, or 3f+3, where f is the number of maximum faulty consensus nodes, (N−f−1)/N of the blockchain consensus nodes only need to store "hot" data as a current state tree, instead of both "cold" and "hot" data as the historic state tree.

Moreover, for the N consensus nodes blockchain network where f+1 nodes are used as shared storage nodes to store the historic state tree, a maximum off faulty consensus nodes can be tolerated. In other words, the saving of storage space does not compromise data reliability. The consensus nodes of the blockchain network can be properly served by tolerating f faulty consensus nodes and saving the entire copy of blockchain only on f+1 nodes. Because the reliability of the system is ensured by the f+1 shared storage node, data security can be improved and relatively independent from the security level of the underlying service platform.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
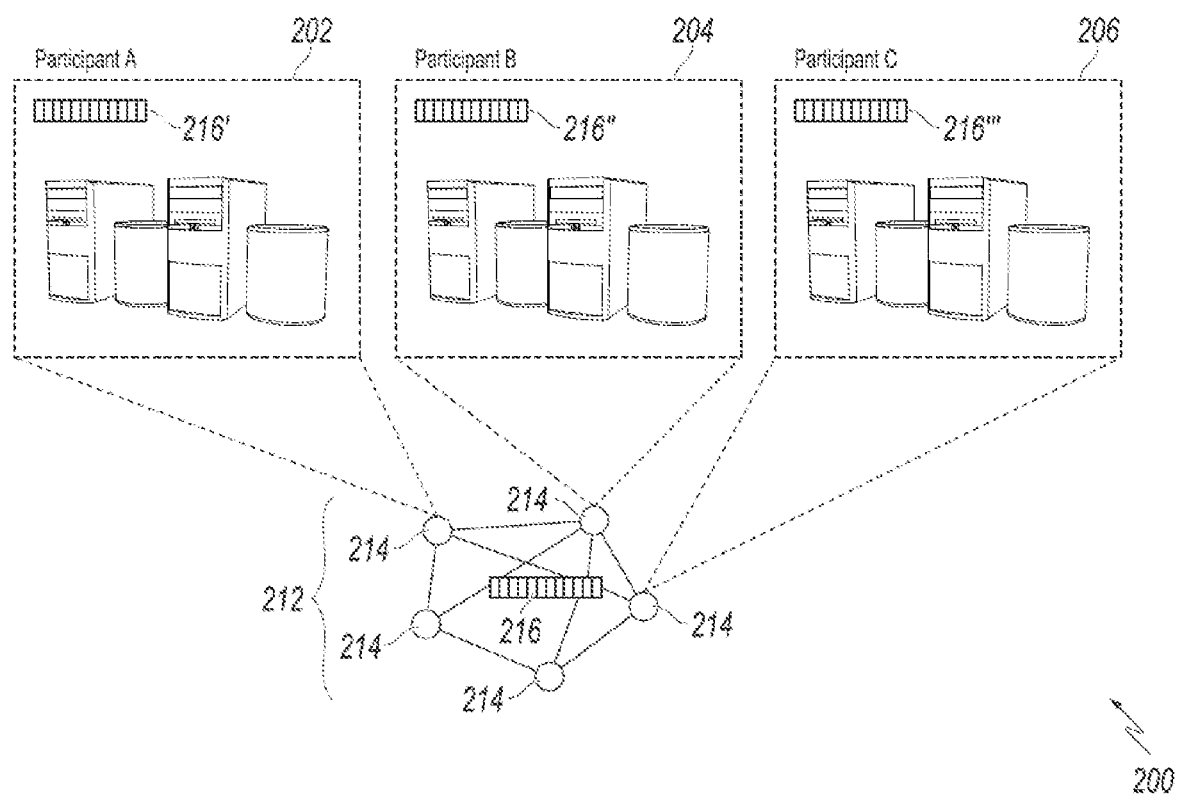
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

As described earlier, blockchain networks can store different types of data such as state data, block data, and index data. State data are often stored as a content-addressed state tree (e.g., MPT or FDMT). Content-addressed state trees are incremental in nature. That is, changes of account states are reflected by adding new tree structures instead of updating the existing state tree. Therefore, the content-addressed state trees can grow very large in size when blocks are continuously added to the blockchain. On the other hand, most data in the trees are infrequently used historic state data. Storing those historic state data in every blockchain node can be quite inefficient in terms of storage resource usage.

Under the FDMT storage scheme, state data can be separated into current state data associated with the current block and historic state data associated with all blocks of the blockchain. To save on storage resources without materially affecting computational efficiency, the historic state data can be stored on one or more trusted storage locations or one or more shared storage nodes elected through voting. Access of the historic state data can then be shared by other nodes of the blockchain network.

In addition to sharing historic state data, block data may also be shared. Instead of storing every transaction and block generated on the blockchain, regular consensus nodes can store block headers instead of entire blocks. The consensus nodes can inquire the shared storage nodes that store the entire blocks when verification of blockchain transactions are needed. Since the consensus nodes store the current state data associated with the current block, such data can be used for executing smart contract. Therefore, by sharing historic state data and block data, the storage consumption of the blockchain network can be reduced without significant compromising processing efficiency of transactions.

Figure 3:
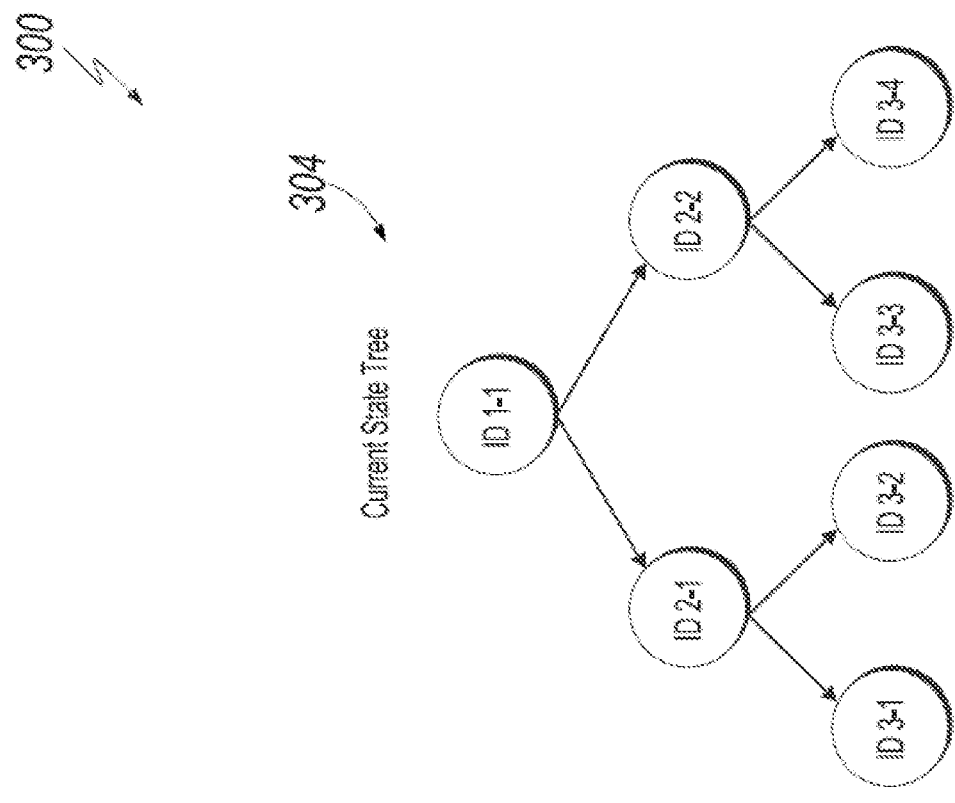
FIG. 3 depicts an example of a fixed depth Merkle tree (FDMT) data structure in accordance with embodiments of this specification.
Figure 3:
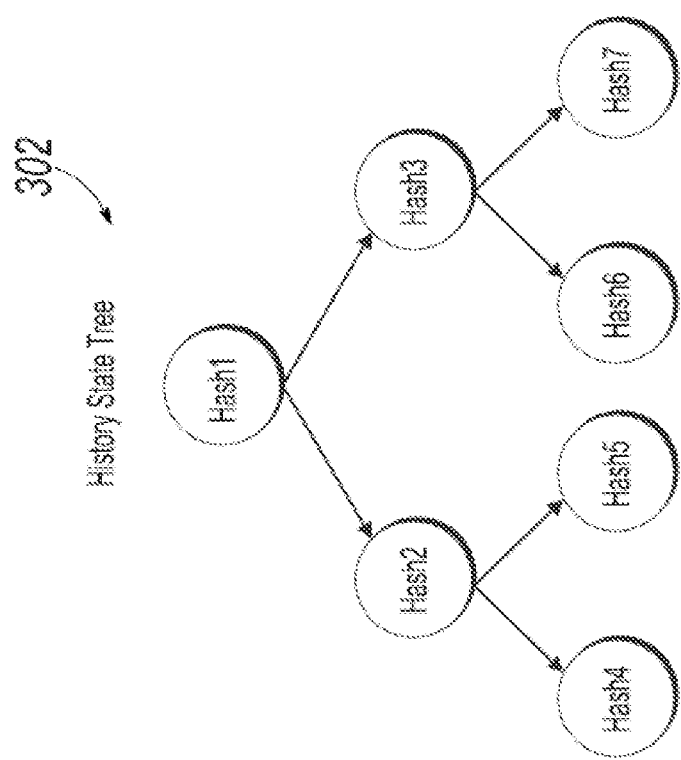

FIG. 3 depicts an example of an FDMT data structure 300 in accordance with embodiments of this specification. Under FDMT, account states can be stored as KVPs in the structures of a historic state tree 302 and a current state tree 304. The keys correspond to addresses that uniquely identify values of blockchain accounts. The historic state tree 302 can include an entire copy of available state information of the blockchain. The current state tree 304 can include state information of a current block. Therefore, the size of the current state tree 304 can be significantly smaller than the size of the historic state tree 302.

In some embodiments, the current state tree 304 can be a location-addressed state tree. For a location-addressed state tree, a node value of the current state tree 304 can be retrieved based on a key that uniquely identifies the node (i.e., a node ID). When new node is added to the current state tree 304, node value can be associated with its unique node ID (e.g., ID 1-1, ID 2-1, etc. of the current state tree 304) without regard to its content. In some cases, a KVP of the current state tree 304 can be expressed as <node ID, node value>. In some cases, the keys of the KVPs can further include a corresponding block ID of the node value. In such cases, the node ID can serve as prefix and the block ID can serve us suffix of keys. The KVP of the current state tree 304 can then be expressed as <node ID+block ID, node value>.

In some embodiments, the historic state tree 302 can be a content-addressed state tree. For a content-addressed state tree, each account value can have a content address uniquely associated with the value to the information content itself. To retrieve information from a historic state tree 302, a content identifier can be provided, from which the location of the account value can be determined and retrieved. Similar to MPT, each node of the historic state tree 302 can include a hash value of a pointer (e.g., Hash1, Hash2, and Hash3 under the historic state tree 302) pointing to the next node of the tree. Following paths of the pointers, the last elements stores hash values of end portion of the keys (e.g., Hash4, Hash5, Hash6, and Hash7 under the historic state tree 302) and the values that the keys are paired with. KVPs of the historic state tree 302 can be expressed as <hash(node value), node value>.

Since node addresses of content-addressed trees are dependent on node values, new state information can be added as additional tree structure to the historic state tree 302 rather than making changes to the existing tree to preserve tree structure and improve data storage/retrieval efficiency.

Figure 4:
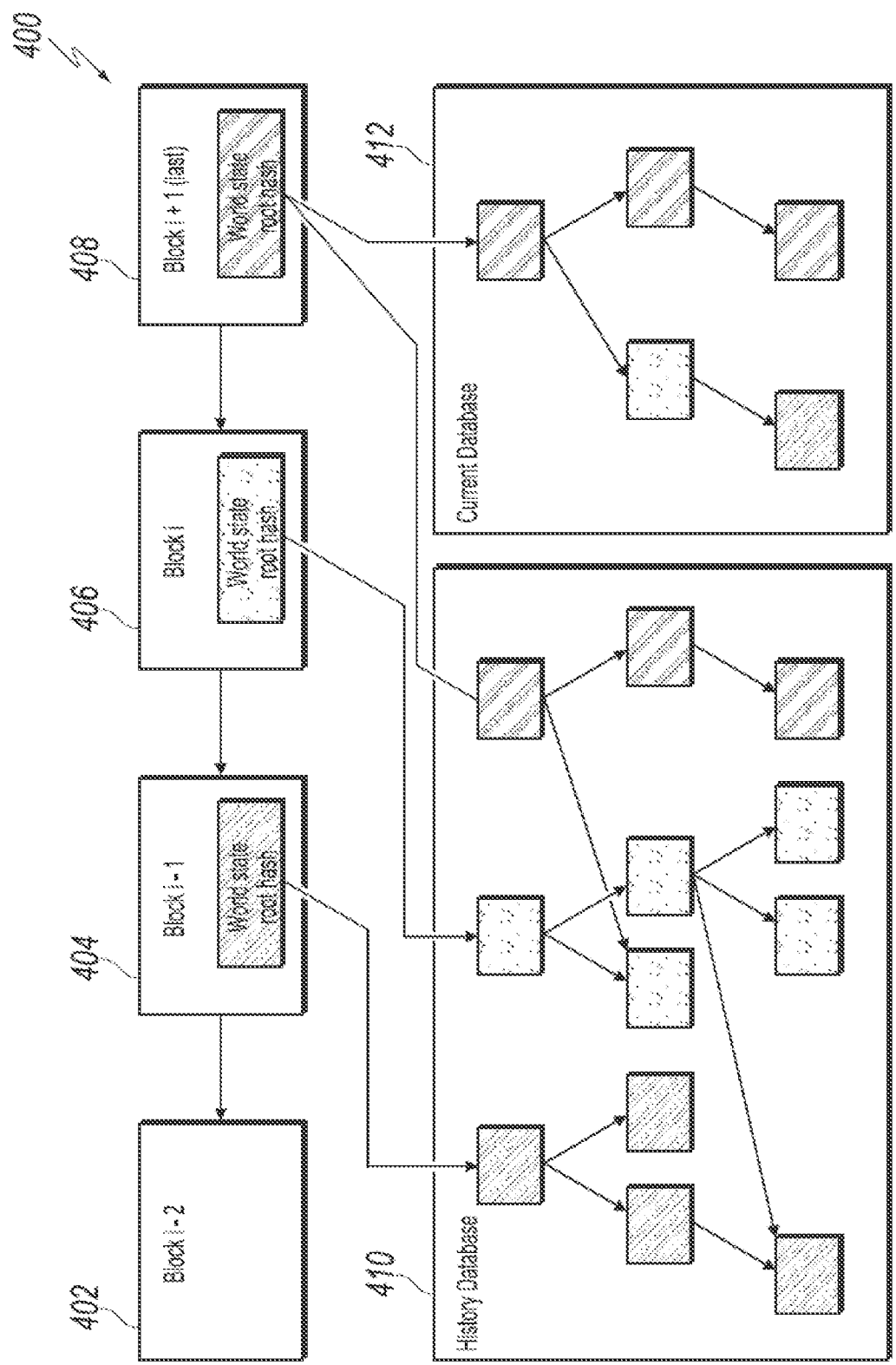
FIG. 4 depicts examples of databases for storing blockchain data in accordance with embodiments of this specification.

FIG. 4 depicts examples of databases 400 for storing blockchain data in accordance with embodiments of this specification. The databases 400 can be key-value databases such as levelDB or RocksDB. The databases 400 can store data under the FDMT data structure, which includes history database 410 for storing historic state tree and current database 412 for storing current state tree. For the four blocks depicted in FIG. 4, block i−2 402, block i−1 404, and block i 406 are previously completed blocks. Block i+1 408 is a current block. Each block can have a block header and a block body. The block header can include information such as a root hash of the world state. The root hash can serve as a secure and unique identifier for the state trees. In other words, the root hash can be cryptographically dependent on account states. The block body can include confirmed transactions of the corresponding block.

The history database 410 can store the historic state tree. The current database 412 can store the current state tree. The historic state tree and current state tree can store historical and current account states. Ethereum blockchain accounts can include externally owned accounts and contract accounts. Externally owned accounts can be controlled by private keys and are not associated with any code for executing smart contract. Contract accounts can be controlled by their contract code are associated with code for executing smart contract.

States of Ethereum accounts can include four components: nonce, balance, codeHash, and storageRoot. If the account is an externally owned account, the nonce can represent the number of transactions sent from the account address. The balance can represent the digital assets owned by the account. The codeHash can be the hash of an empty string. The storageRoot can be empty. If the account is a contract account, the nonce can represent the number of contracts created by the account. The balance can represent the digital assets owned by the account. The codeHash can be the hash of a virtual machine code associated with the account. The storageRoot can store a root hash associated with a storage tree. The storage tree can store contract data by encoding the hash of the storage contents of the account.

The historic state tree can include an entire copy of account states of the blockchain from the genesis block, and can be updated according to transaction executions. For example, root hash stored in previous block i−1 404 is a root hash of the world state at the time block i−1 404 is completed. The world state is associated with all transactions stored in block i−1 404 and blocks prior to block i−1 404. Similarly, root hash stored in the current block i+1 408 is a root hash of the world state associated with all transactions stored in block i+1 408 and blocks prior to block i+1 408.

The current state tree can include state information that is updated or added due to transactions newly added to the current block i+1 408. As discussed in the description of FIG. 3, the historic state tree can store state information as KVPs expressed as <hash(node value), node value>, which is content-addressable. In some embodiments, the current state tree can be location-addressed based on one or more location related IDs. For example, the current state tree can store state information as KVPs expressed as <node ID, node value>, where the node values can be addressed based on their corresponding node IDs. As another example, the keys of the KVPs can be a combination of the node ID and the corresponding block ID of the node value. The node ID can serve as prefix and the block ID can serve us suffix of keys for traversing values of an FDMT or MPT.

Figure 5:
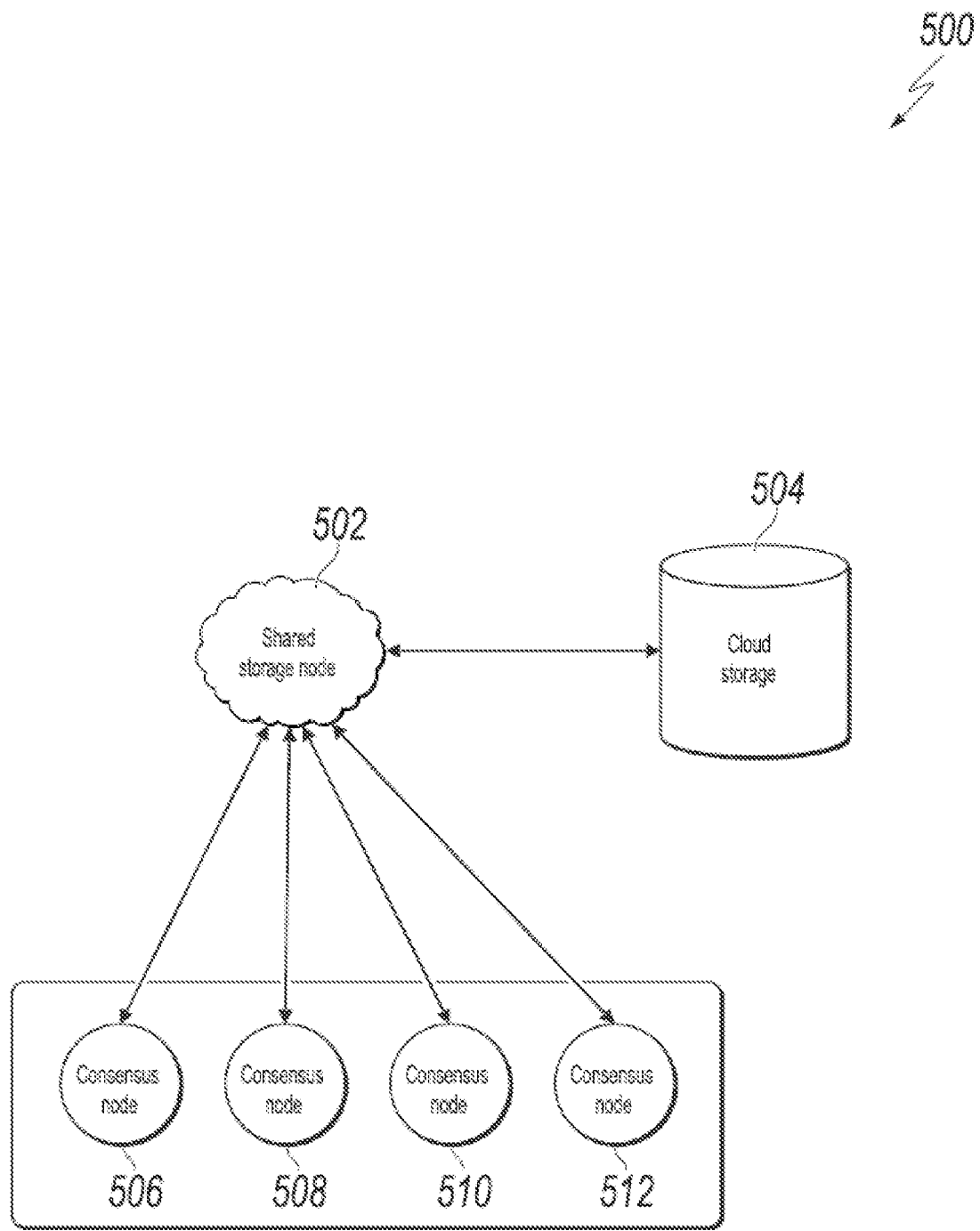
FIG. 5 depicts an example of a blockchain network using shared storage in accordance with embodiments of this specification.

FIG. 5 depicts an example of a blockchain network 500 using shared storage in accordance with embodiments of this specification. At a high-level, the blockchain network 500 includes a plurality of consensus nodes 506, 508, 510, and 512, a shared storage node 502, and a cloud storage 504 communicably coupled to the shared storage node 502. The shared storage node 502 can be a node with proof of authority (POA). In some cases, the POA can be provided based on the status of the shared storage node 506. For example, the shared storage node 506 can be a node administered by a deployer of the blockchain network 500. In such cases, the shared storage node 502 can be part of the blockchain network 500 or outside of the blockchain network 500. In some cases, the POA can be gained through voting. For example, assume that the blockchain network includes 3f+1 nodes (f=1 in the example as depicted in FIG. 5, when the shared storage node 502 participates in consensus of the blockchain network 500), the maximum faulty consensus nodes or Byzantine nodes (nodes that fail to act or act maliciously) that can be tolerated is f. As such, if 2f+1 nodes cast votes (endorsed by their respective digital signatures) to elect the shared storage node 502, the votes 2f+1 can be used as POA for trusting the shared storage node 502.

As described in the discussion of FIG. 4, under the FDMT data structure, current state data can be separated from the state data. The current state data can be stored as a current state tree, which includes state information associated with a current block, such as state data updated or added according to transactions newly added to the current block. In an Ethereum type system, state information associated with the current block can be considered as "hot" data, frequently retrieved by a virtual machine to execute smart contracts. Historic state data can be stored as a historic state tree, which can include an entire copy of account states of the blockchain from the genesis block. State information associated with previous blocks stored in the historic state tree can be considered as "cold" data, which are visited less often for executing smart contract.

Data in a content-addressed state tree (e.g., MPT or the historic state) are incremental in nature. That is, changes of account states due to additions of new blocks do not change existing historic states, but are reflected by adding new tree structures to the historic state tree. Therefore, historic state tree can grow very large in size due to generations of new blocks. Because most data in the historic state tree are "cold" data that are infrequently used, storing those data in every blockchain node can be quite inefficient in terms of usage of storage resources.

To save on storage resources without significantly compromising computational efficiency, the historic state tree can be stored on a history database (such as the history database 410 described in FIG. 4) associated with a shared storage node 502 or a cloud storage 504 communicably coupled to the shared storage node 502. In some embodiments, the shared storage node 502 can share access of the historic state tree to the consensus nodes 506, 508, 510, and 512. The cloud storage 504 can be a storage device that provides storage service on the cloud, such as a network attached storage (NAS) or object storage service (OSS).

In some embodiments, when transactions are processed into a current block, state data associated with the transactions can be sent by one or more of the consensus nodes 506, 508, 510, and 512 to the shared storage node 502 for storage. In some embodiments, the one or more of the consensus nodes 506, 508, 510, and 512 can send the state data and a hash value of the state data as a KVP to the shared storage node 502. After receiving the state data or the KVP, the shared storage node 502 can verify if the received state data or the KVP has already been locally stored or stored in the cloud storage 504. If yes, the shared storage node 502 can reject or abandon the received state data. Otherwise, the shared storage node 502 can calculate a hash value of the state data or verify that the received hash value is the hash value of the state data, and store the hash value and the state data to the historic state tree.

In some embodiments, the shared storage node 502 can verify whether the state data are valid state data of the blockchain. The shared storage node 502 can calculate a hash value of the received state data. As discussed earlier, the shared storage node 502 can store the historic state tree, which is content-addressed and includes an entire copy of state information of the blockchain. The calculated hash value can then be used for verifying whether the state data is part of the blockchain based on the world state root hash of the blockchain (e.g., using Merkle proof). If the hash value is verified as part of the blockchain, the state data can be determined as content-addressed data.

When any one of the consensus nodes 506, 508, 510, and 512 needs to retrieve state data from the shared storage node 502, a corresponding hash value can be sent to the shared storage node 502. Since the historic state tree stored in the shared storage node 502 is content-addressed, the hash value can be used as key for addressing the corresponding state data that produces the hash value. After identifying the corresponding state data based on the hash value, the shared storage node 502 can send the identified state data back to the consensus node. The consensus node receiving the state data can hash the received state data to verify whether the state data is content-addressed. If yes, the state data can be determined as authentic. Otherwise, the state data is unauthentic. If the state data is unauthentic, the consensus node can choose to report the shared storage node 502 as a faulty node (or a Byzantine node). If there are other nodes in the blockchain network 500 that store the historic state tree, the consensus node can send the hash value to one or more of the other nodes to retrieve the corresponding state data.

Figure 6:
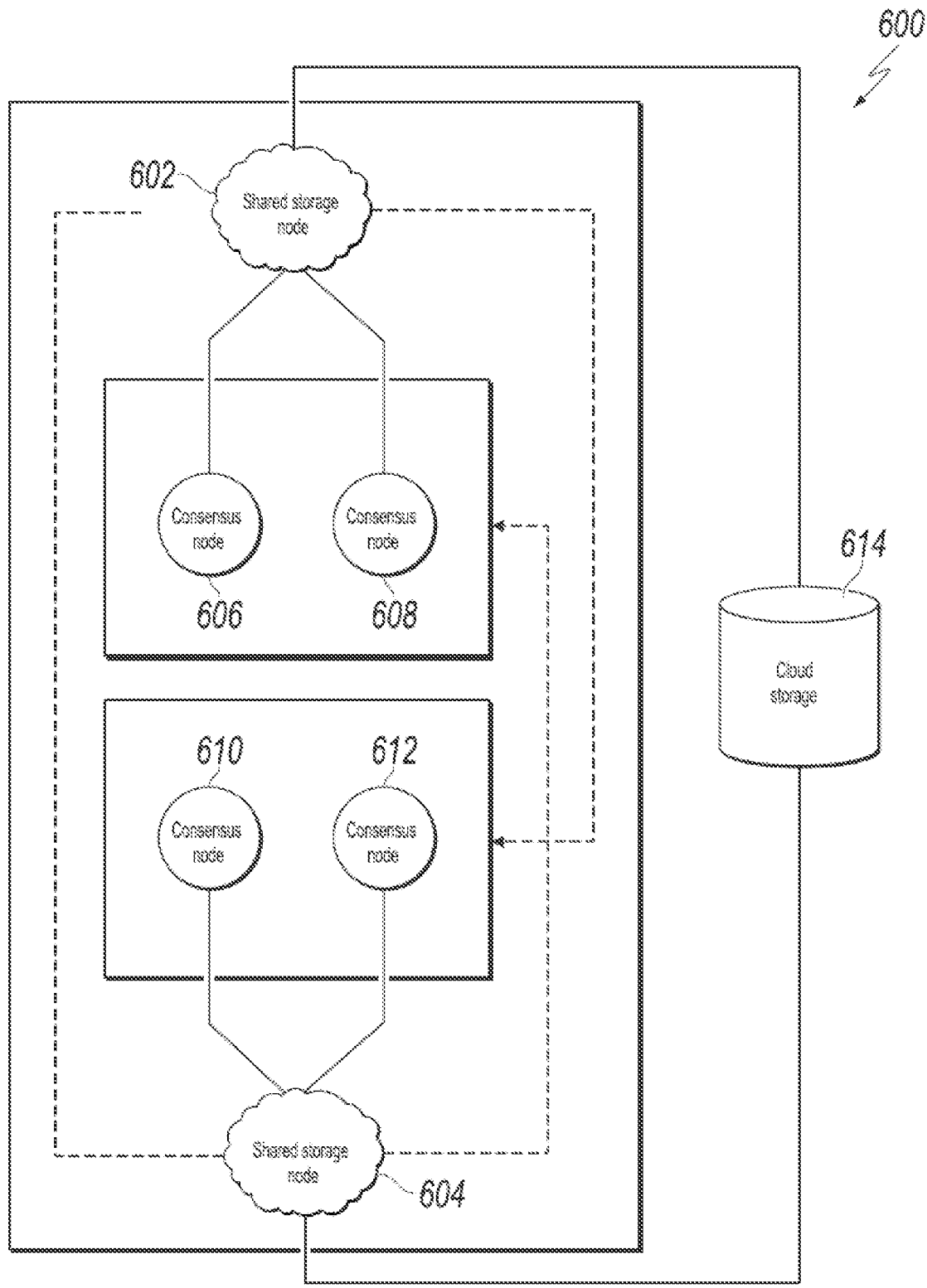
FIG. 6 depicts another example of a blockchain network using shared storage in accordance with embodiments of this specification.

FIG. 6 depicts another example of a blockchain network 600 using shared storage in accordance with embodiments of this specification. At a high-level, the blockchain network 600 includes a plurality of consensus nodes 606, 608, 610, and 612, a plurality of shared storage nodes 602 and 604, and a cloud storage 614 communicably coupled to one or more of the plurality of shared storage nodes 602 and 604. In some cases, the shared storage nodes 602 and 604 can be nodes with POA, such as nodes being administered by a deployer of the blockchain network 600. In such cases, the shared storage nodes 602 and 604 can be part of the blockchain network 600 or outside of the blockchain network 600. In some cases, the POA can be gained through voting. For example, assume that the blockchain network includes 3f+1 nodes (f=1 in the example as depicted in FIG. 6, when none of the shared storage nodes 602 and 604 participates in the consensus of the blockchain network 600), 3f+2 nodes (when one of the shared storage nodes 602 and 604 participates in the consensus of the blockchain network 600), or 3f+3 nodes (when both of the shared storage nodes 602 and 604 participate in the consensus of the blockchain network), where f is the maximum number of Byzantine nodes, if 2f+1 nodes cast votes (endorsed by their respective digital signatures) to elect a consensus node as a shared storage node, the 2f+1 votes can be used as POA for trusting the shared storage node.

As discussed earlier, to save on storage resources without significantly sacrificing computational efficiency, the historic state tree can be stored on a history database (such as the history database 410 described in FIG. 4) associated with the shared storage nodes 602 and 604 or the cloud storage 614 communicably coupled to the shared storage nodes 602 and 604. The shared storage nodes 602 and 604 can share access of the historic state tree to the consensus nodes 606, 608, 610, and 612. The cloud storage 614 can be a storage device that can provide storage service on the cloud, such as an NAS or OSS.

When transactions are processed into a current block, state data associated with the transactions can be sent by one or more of the consensus nodes 606, 608, 610, and 612 to the shared storage nodes 602 and 604 for storage. In some embodiments, the one or more of the consensus nodes 606, 608, 610, and 612 can send the state data and a hash value of the state data as a KVP to the shared storage nodes 602 and 604. After receiving the state data, the shared storage nodes 602 and 604 can verify if the received state data or KVP has already been locally stored or stored in the cloud storage 614. If yes, the shared storage nodes 602 and 604 can reject or abandon the received state data. Otherwise, the shared storage nodes 602 and 604 can calculate a hash value of the state data or verify that the received hash value is the hash value of the state data, and store the hash value and the state data to the historic state tree.

In some embodiments, the shared storage nodes 602 and 604 can verify whether the state data are valid state data of the blockchain. As discussed earlier, the shared storage nodes 602 and 604 can store the historic state tree, which is content-addressed and includes an entire copy of state information of the blockchain. The shared storage nodes 602 and 604 can calculate a hash value of the received state data. The calculated hash value can then be used for verifying whether the state data is part of the blockchain based on the world state root hash of the blockchain (e.g., using Merkle proof). If yes, the state data can be determined as content-addressed.

When any one of the consensus nodes 606, 608, 610, and 612 needs to retrieve state data from the shared storage node 602 or 604, a corresponding hash value can be sent to a shared storage node that the consensus node is in communication with. As shown in the example depicted in FIG. 6, consensus nodes 606 and 608 can send the hash value to storage node 602, consensus nodes 610 and 612 can send the hash value to storage node 604. A consensus node can select shared storage node for retrieving state data from based on geographic proximity, network condition, established communication protocol, security consideration, etc. It is to be understood that any of the consensus nodes 606, 608, 610, and 612 can choose to communicate with any of the shared storage nodes 602 and 604, according to different embodiments of the present specification.

Since the historic state tree stored in the shared storage nodes 602 and 604 is content-addressed, the hash value can be used as key for addressing the corresponding state data. After identifying the corresponding state data based on the hash value, the corresponding shared storage node 602 or 604 can send the identified state data back to the consensus node. The consensus node receiving the state data can hash the received state data to verify whether the state data is content-addressed. If yes, the state data is determined as authentic. Otherwise, the state data is unauthentic. If the state data is unauthentic, the consensus node can choose to report the shared storage node as a faulty node (or a Byzantine node). If there are other nodes in the blockchain network 600 that store the historic state tree, the consensus node can send the hash value to one or more of the other nodes to retrieve the corresponding state data.

Figure 7:
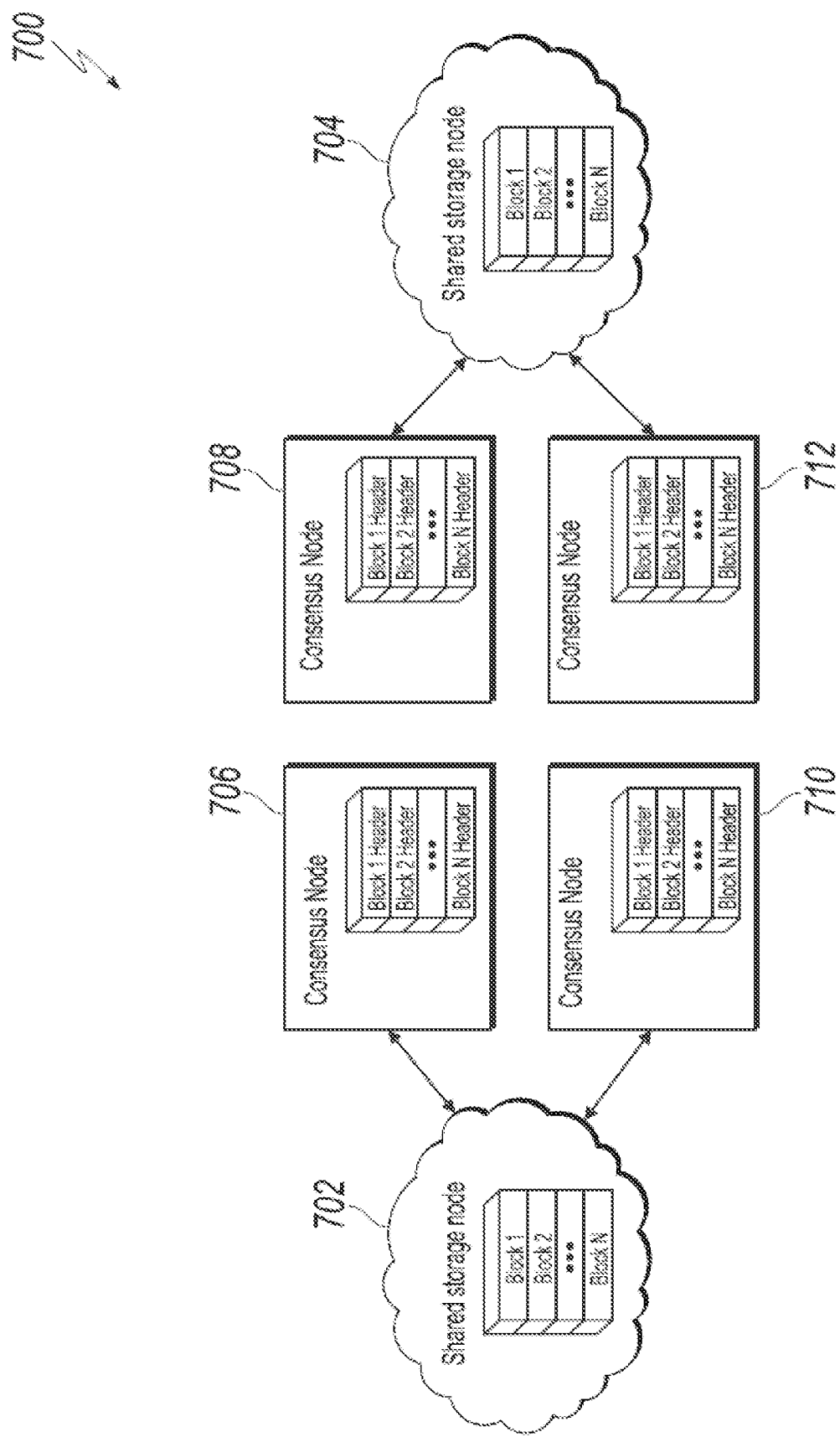
FIG. 7 depicts yet another example of a blockchain network using shared storage in accordance with embodiments of this specification.

FIG. 7 depicts yet another example of a blockchain network 700 using shared storage in accordance with embodiments of this specification. At a high-level, the blockchain network 700 includes a plurality of consensus nodes 706, 708, 710, and 712, a plurality of shared storage nodes 702 and 704, and a cloud storage 714 communicably coupled to one or more of the plurality of shared storage nodes 702 and 704. The shared storage nodes 702 and 704 can be nodes with POA, such as nodes being administered by a deployer of the blockchain network 700. In such cases, the shared storage nodes 702 and 704 can be part of the blockchain network 700 or outside of the blockchain network 700. As described earlier, the POA can also be gained through voting. For example, assume that the blockchain network includes 3f+1 nodes (f=1 in the example as depicted in FIG. 7, when none of the shared storage nodes 702 and 704 participates in the consensus of the blockchain network 700), 3f+2 nodes (when one of the shared storage nodes 702 and 704 participates in the consensus of the blockchain network 700), or 3f+3 nodes (when both of the shared storage nodes 702 and 704 participate in the consensus of the blockchain network), where f is the maximum number of Byzantine nodes, if 2f+1 nodes cast votes (endorsed by their respective digital signatures) to elect a consensus node as a shared storage node, the 2f+1 votes can be used as POA for trusting the shared storage node.

To save on storage resources without significantly compromising computational efficiency, the historic state tree can be stored on a history database (such as the history database 410 described in FIG. 4) associated with the shared storage nodes 702, 704 or a cloud storage (e.g., NAS or OSS). The shared storage nodes 702 and 704 can share access of the historic state tree to the consensus nodes 706, 708, 710, and 712.

In some embodiments, in addition to sharing historic state data from the shared storage nodes 702 and 704, block data can also be shared. Similar to full nodes of a blockchain network, shared storage nodes 702 and 704 can store an entire copy of the blockchain, which includes every transaction and block generated on the blockchain. In some embodiments, the shared storage nodes 702 and 704 can store block body of every block of the blockchain. Similar to light weight nodes of a blockchain network, the consensus nodes 706, 708, 710, and 712 can store block header of every block of the blockchain, based on methods such as the simplified payment verification (SPV). SPV can allow a node to verify if a transaction has been included in a block, without having to download the entire blockchain. Since the consensus nodes 706, 708, 710, and 712 also store the current state tree, state data associated with the current block can be used for executing smart contract. As such, by sharing block data from the shared storage nodes 702 and 704, the storage consumption of the consensus nodes 706, 708, 710, and 712 can be further reduced while maintaining the ability to directly execute smart contract.

Figure 8:
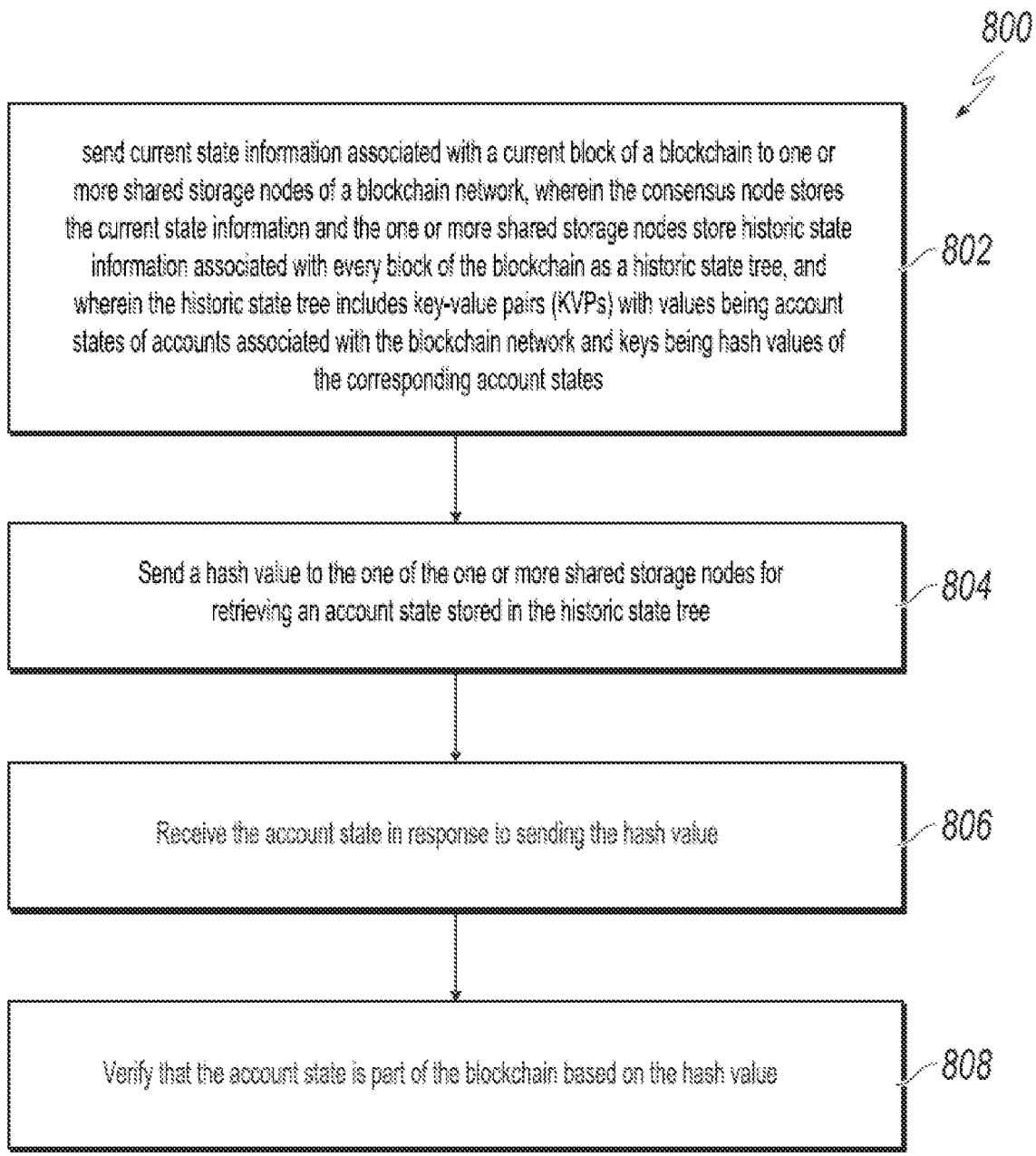
FIG. 8 depicts an example of a process that can be executed in accordance with embodiments of this specification.

FIG. 8 is a flowchart of an example of a process 800 for communicating and sharing blockchain data. For convenience, the process 800 will be described as being performed by a system of one or more computers, located in one or more locations, and programmed appropriately in accordance with this specification. For example, a computing device in a computing system, e.g., the computing system 106, 108 of FIG. 1, appropriately programmed, can perform the process 800.

At 802, a consensus node of a blockchain network sends current state information associated with a current block of a blockchain to one or more shared storage nodes of the blockchain network, wherein the consensus node stores the current state information and the one or more shared storage nodes store historic state information associated with every block of the blockchain as a historic state tree, and wherein the historic state tree includes KVPs with values being account states of accounts associated with the blockchain network and keys being hash values of the corresponding account states.

At 804, the consensus node sends a hash value to the one of the one or more shared storage nodes for retrieving an account state stored in the historic state tree.

At 806, the consensus node receives the account state in response to sending the hash value.

At 808, the consensus node verifies that the account state is part of the blockchain based on the hash value.

In some cases, the blockchain network includes at least f+1 shared storage nodes and no more than 2f+2 consensus nodes, and wherein f is the maximum number of faulty shared storage nodes and consensus nodes that can be tolerated within the blockchain network.

In some cases, the one or more shared storage nodes are elected by receiving 2f+1 votes from all 3f+1, 3f+2, or 3f+3 nodes of the blockchain network, and wherein f is the maximum number of faulty shared storage nodes and consensus nodes that can be tolerated within the blockchain.

In some cases, the current state tree includes KVPs with values being account sates associated with the current block and keys being node IDs corresponding to nodes of the current state tree and a block ID corresponding to the current block.

In some cases, the current state information sent by the consensus node includes a digital signature generated based on a private key associated with the consensus node.

In some cases, sending the current state information further comprises sending the current state information and a hash value of the current state information as KVP to the one or more shared storage nodes of the blockchain network.

In some cases, verifying that the account state is part of the blockchain is performed based on hashing the account state to generate a hashed account state and comparing the hashed account state to the hash value.

In some cases, the one or more shared storage nodes store historic state information locally or on a cloud storage.

In some cases, the current state tree and the historic state tree are stored as a fixed depth Merkle tree.

Figure 9:
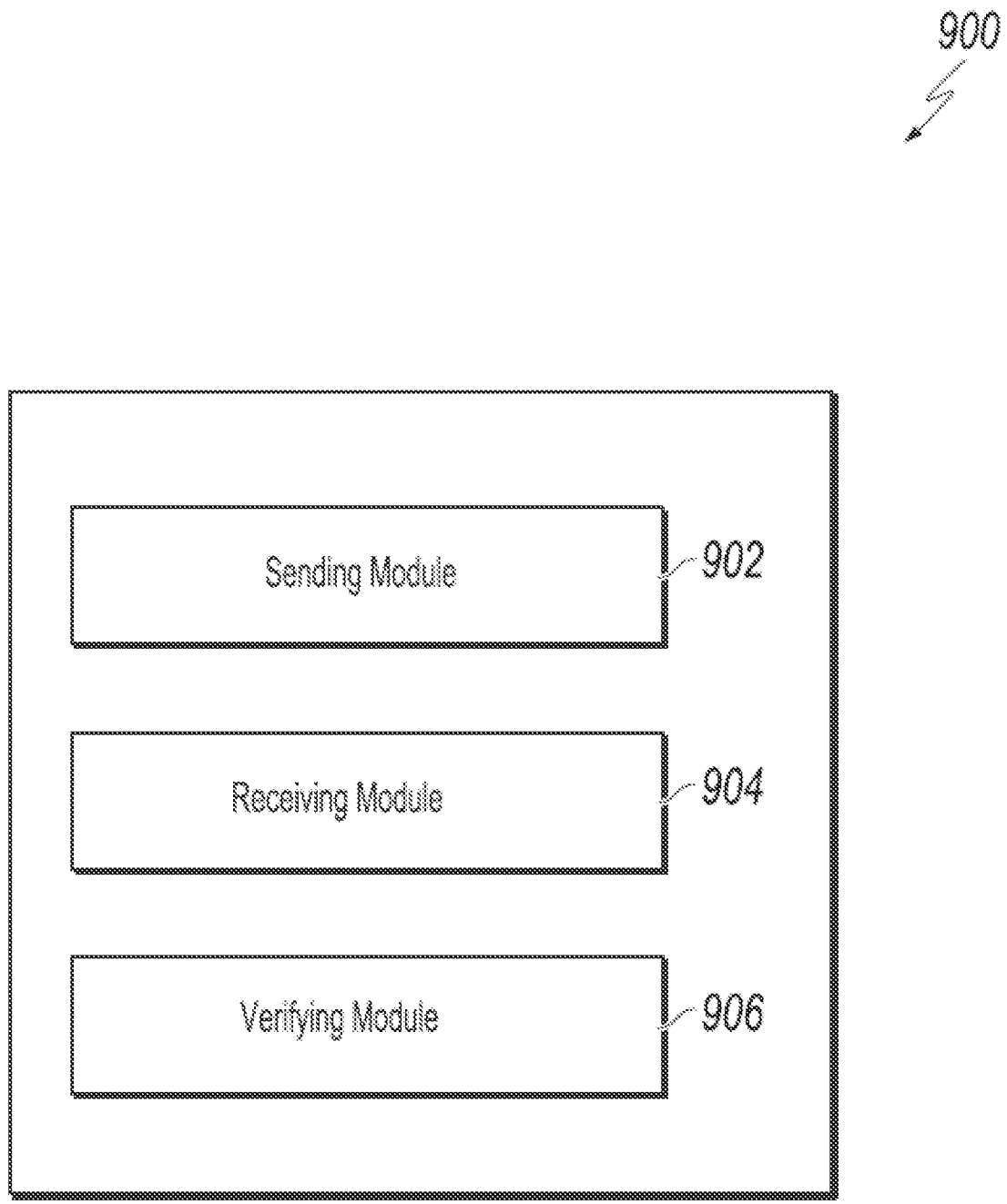
FIG. 9 depicts examples of modules of an apparatus in accordance with embodiments of this specification.

FIG. 9 is a diagram of on example of modules of an apparatus 900 in accordance with embodiments of this specification.

The apparatus 900 can be an example of an embodiment of a consensus node configured to communicate and share blockchain data. The apparatus 900 can correspond to the embodiments described above, and the apparatus 900 includes the following: a sending module 902 that sends current state information associated with a current block of a blockchain to one or more shared storage nodes of the blockchain network, wherein the consensus node stores the current state information and the one or more shared storage nodes store historic state information associated with every block of the blockchain as a historic state tree, and wherein the historic state tree includes KVPs with values being account states of accounts associated with the blockchain network and keys being hash values of the corresponding account states; the sending module 902 that sends a hash value to the one of the one or more shared storage nodes for retrieving an account state stored in the historic state tree; a receiving module 904 that receives the account state in response to sending the hash value; and a verifying module 906 that verifies the account state is part of the blockchain based on the hash value.

In an optional embodiment, the apparatus 900 further includes the following: the blockchain network includes at least f+1 shared storage nodes and no more than 2f+2 consensus nodes, and wherein f is the maximum number of faulty shared storage nodes and consensus nodes that can be tolerated within the blockchain network.

In an optional embodiment, the one or more shared storage nodes are elected by receiving 2f+1 votes from all 3f+1, 3f+2, or 3f+3 nodes of the blockchain network, and wherein f is the maximum number of faulty shared storage nodes and consensus nodes that can be tolerated within the blockchain.

In an optional embodiment, the current state tree includes KVPs with values being account sates associated with the current block and keys being node IDs corresponding to nodes of the current state tree and a block ID corresponding to the current block.

In an optional embodiment, the current state information sent by the consensus node includes a digital signature generated based on a private key associated with the consensus node.

In an optional embodiment, sending the current state information further comprises sending the current state information and a hash value of the current state information as KVP to the one or more shared storage nodes of the blockchain network.

In an optional embodiment, verifying that the account state is part of the blockchain is performed based on hashing the account state to generate a hashed account state and comparing the hashed account state to the hash value.

In an optional embodiment, the one or more shared storage nodes store historic state information locally or on a cloud storage.

In an optional embodiment, the current state tree and the historic state tree are stored as a fixed depth Merkle tree.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 9, it can be interpreted as illustrating an internal functional module and a structure of a consensus node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

The techniques described in this specification produce several technical effects. For example, embodiments of the subject matter can allow savings of storage resources of blockchain nodes without significantly sacrificing computational efficiency. Because most data in the historic state tree are "cold" data that are infrequently used, by saving the "cold" data only in the shared storage nodes, usage rate of storage space across the blockchain network can be significantly improved. If the share storage node is a POA node or elected by voting based on PBFT consensus, the historic state tree only needs to be stored in the share storage node instead of storing on every blockchain node. If shared storage nodes are part of the blockchain consensus nodes without POA, for an N consensus nodes blockchain network, where N equals 3f+1, 3f+2, or 3f+3, where f is the number of maximum faulty consensus nodes, (N−f−1)/N of the blockchain consensus nodes only need to store "hot" data as a current state tree, instead of both "cold" and "hot" data as the historic state tree.

Moreover, for the N consensus nodes blockchain network where f+1 nodes are used as shared storage nodes to store the historic state tree, a maximum off faulty consensus nodes can be tolerated. In other words, the saving of storage space does not compromise data reliability. The consensus nodes of the blockchain network can be properly served by tolerating f faulty consensus nodes and saving the entire copy of blockchain only on f+1 nodes. Because the reliability of the system is ensured by the f+1 shared storage node, data security can be improved and relatively independent from the security level of the underlying service platform.

Described embodiments of the subject matter can include one or more features, alone or in combination.

For example, in a first embodiment, a computer-implemented method for communicating shared blockchain data, the method comprising: sending, by a consensus node of a blockchain network, current state information associated with a current block of a blockchain to one or more shared storage nodes of the blockchain network, wherein the consensus node stores the current state information and the one or more shared storage nodes store historic state information associated with every block of the blockchain as a historic state tree, and wherein the historic state tree includes KVPs with values being account states of accounts associated with the blockchain network and keys being hash values of the corresponding account states; sending, by the consensus node, a hash value to the one of the one or more shared storage nodes for retrieving an account state stored in the historic state tree; receiving, by the consensus node, the account state in response to sending the hash value; and verifying, by the consensus node, that the account state is part of the blockchain based on the hash value.

The foregoing and other described embodiments can each, optionally, include one or more of the following features:

A first feature, combinable with any of the following features, specifies that the blockchain network includes at least f+1 shared storage nodes and no more than 2f+2 consensus nodes, and wherein f is the maximum number of faulty shared storage nodes and consensus nodes that can be tolerated within the blockchain network.

A second feature, combinable with any of the previous or following features, specifies that the one or more shared storage nodes are elected by receiving 2f+1 votes from all 3f+1, 3f+2, or 3f+3 nodes of the blockchain network, and wherein f is the maximum number of faulty shared storage nodes and consensus nodes that can be tolerated within the blockchain.

A third feature, combinable with any of the previous or following features, specifies that the current state tree includes KVPs with values being account sates associated with the current block and keys being node IDs corresponding to nodes of the current state tree and a block ID corresponding to the current block.

A fourth feature, combinable with any of the previous or following features, specifies that the current state information sent by the consensus node includes a digital signature generated based on a private key associated with the consensus node.

A fifth feature, combinable with any of the previous or following features, specifies that sending the current state information further comprises sending the current state information and a hash value of the current state information as KVP to the one or more shared storage nodes of the blockchain network.

A sixth feature, combinable with any of the previous or following features, specifies that verifying that the account state is part of the blockchain is performed based on hashing the account state to generate a hashed account state and comparing the hashed account state to the hash value.

A seventh feature, combinable with any of the previous or following features, specifies that the one or more shared storage nodes store historic state information locally or on a cloud storage.

An eighth feature, combinable with any of the previous or following features, specifies that the current state tree and the historic state tree are stored as a fixed depth Merkle tree.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for communicating shared blockchain data, the method comprising:

receiving, by a shared storage node of a blockchain network, current state information associated with a current block of a blockchain from a consensus node of the blockchain network, wherein the consensus node stores the current state information in a current state tree configured to include state information that is updated or added due to transactions added to the current block, wherein the shared storage node stores historic state information associated with one or more blocks of the blockchain as a historic state tree, wherein the historic state tree includes key-value pairs (KVPs) with values including a first account state of a first account associated with the blockchain network and keys including a first hash value of the first account state, and wherein the consensus node does not store the historic state tree;

receiving, by the shared storage node, data comprising a hash value for retrieving an account state stored in the historic state tree; and sending, by the shared storage node to the consensus node, the account state in response to receiving the data.

2. The method of claim 1, wherein the blockchain network includes at least f+1 shared storage nodes and no more than 2f+2 consensus nodes, and wherein f is a maximum number of faulty shared storage nodes and consensus nodes that can be tolerated within the blockchain network.

3. The method of claim 1, wherein one or more shared storage nodes, including the shared storage node, of the blockchain network are elected by receiving 2f+1 votes from all 3f+1, 3f+2, or 3f+3 nodes of the blockchain network, and wherein f is a maximum number of faulty shared storage nodes and consensus nodes that can be tolerated within the blockchain.

4. The method of claim 1, wherein the current state tree includes KVPs with values being account sates associated with the current block and keys being node IDs corresponding to nodes of the current state tree and a block ID corresponding to the current block.

5. The method of claim 1, wherein the current state information includes a digital signature generated based on a private key associated with the consensus node.

6. The method of claim 1, wherein receiving the current state information further comprises receiving the current state information and a current state hash value of the current state information as KVP.

7. The method of claim 1, further comprising:
verifying, by the shared storage node, that the current state information has previously been stored; and
discarding, by the shared storage node, the current state information based on verifying that the current state information has previously been stored.

8. The method of claim 1, further comprising:
verifying, by the shared storage node, that the current state information has not previously been stored; and
storing, by the shared storage node, the current state information and a current state hash of the current state information based on verifying that the current state information has not previously been stored.

9. The method of claim 1, further comprising:
verifying, by the shared storage node, that the current state information is part of the blockchain based on hashing the current state information and comparing the hashed current state information to a state root hash.

10. The method of claim 1, wherein the shared storage node stores the historic state information locally or on a cloud storage.

11. The method of claim 1, wherein the current state tree and the historic state tree are stored as a fixed depth Merkle tree.

12. A non-transitory, computer-readable storage medium storing one or more instructions executable by a computer system to perform operations comprising:
receiving, by a shared storage node of a blockchain network, current state information associated with a current block of a blockchain from a consensus node of the blockchain network, wherein the consensus node stores the current state information in a current state tree configured to include state information that is updated or added due to transactions added to the current block, wherein the shared storage node stores historic state information associated with one or more blocks of the blockchain as a historic state tree, wherein the historic state tree includes key-value pairs (KVPs) with values including a first account state of a first account associated with the blockchain network and keys including a first hash value of the first account state, and wherein the consensus node does not store the historic state tree;
receiving, by the shared storage node, data comprising a hash value for retrieving an account state stored in the historic state tree; and
sending, by the shared storage node to the consensus node, the account state in response to receiving the data.

13. The non-transitory, computer-readable storage medium of claim 12, wherein the blockchain network includes at least f+1 shared storage nodes and no more than 2f+2 consensus nodes, and wherein f is a maximum number of faulty shared storage nodes and consensus nodes that can be tolerated within the blockchain network.

14. The non-transitory, computer-readable storage medium of claim 12, wherein one or more shared storage nodes, including the shared storage node, of the blockchain network are elected by receiving 2f+1 votes from all 3f+1, 3f+2, or 3f+3 nodes of the blockchain network, and wherein f is a maximum number of faulty shared storage nodes and consensus nodes that can be tolerated within the blockchain.

15. The non-transitory, computer-readable storage medium of claim 12, wherein the current state tree includes KVPs with values being account sates associated with the current block and keys being node IDs corresponding to nodes of the current state tree and a block ID corresponding to the current block.

16. The non-transitory, computer-readable storage medium of claim 12, wherein the current state information includes a digital signature generated based on a private key associated with the consensus node.

17. The non-transitory, computer-readable storage medium of claim 12, wherein receiving the current state information further comprises receiving the current state information and a current state hash value of the current state information as KVP.

18. The non-transitory, computer-readable storage medium of claim 12, wherein the operations further comprise:
verifying, by the shared storage node, that the current state information has previously been stored; and
discarding, by the shared storage node, the current state information based on verifying that the current state information has previously been stored.

19. The non-transitory, computer-readable storage medium of claim 12, wherein the operations further comprise:
verifying, by the shared storage node, that the current state information is part of the blockchain based on hashing the current state information and comparing the hashed current state information to a state root hash.

20. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a shared storage node of a blockchain network, current state information associated with a current block of a blockchain from a consensus node of the blockchain network, wherein the consensus node stores the current state information in a current state tree configured to include state information that is updated or added due to transactions added to the current block, wherein the shared storage node stores historic state information associated with one or more blocks of the blockchain as a historic state tree, wherein the historic state tree includes key-value pairs (KVPs) with values including a first account state of a first account associated with the blockchain network and keys including a first hash value of the first account state, and wherein the consensus node does not store the historic state tree;

receiving, by the shared storage node, data comprising a hash value for retrieving an account state stored in the historic state tree; and sending, by the shared storage node to the consensus node, the account state in response to receiving the data.

* * * * *